(12) United States Patent
Van Hoof et al.

(10) Patent No.: US 10,747,578 B2
(45) Date of Patent: Aug. 18, 2020

(54) NESTED TENANTS

(71) Applicant: MICROSOFT TECHNOLOGY LICENSING, LLC, Redmond, WA (US)

(72) Inventors: Hubert Van Hoof, Bellevue, WA (US); Grégory Christopher John Vandenbrouck, Bellevue, WA (US); Yurui Zhou, Seattle, WA (US); Andres Carlo Petralli, Redmond, WA (US); David John Brennan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/964,736

(22) Filed: Apr. 27, 2018

(65) Prior Publication Data

US 2019/0332437 A1 Oct. 31, 2019

(51) Int. Cl.
*G06F 15/173* (2006.01)
*G06F 9/50* (2006.01)
(Continued)

(52) U.S. Cl.
CPC ........ *G06F 9/5027* (2013.01); *G06F 16/9024* (2019.01); *H04L 41/12* (2013.01); *H04L 41/5061* (2013.01)

(58) Field of Classification Search
CPC ............... G06F 3/0482; G06F 16/9535; G06F 16/9024; G06F 9/4416; G06F 16/248;
(Continued)

(56) References Cited

U.S. PATENT DOCUMENTS

| 5,877,766 A | 3/1999 | Bates et al. |
| 6,023,699 A * | 2/2000 | Knoblock ............... G06Q 10/06 |

(Continued)

FOREIGN PATENT DOCUMENTS

| WO | 2015160346 A1 | 10/2015 |
| WO | 2016054629 A1 | 4/2016 |

OTHER PUBLICATIONS

"Non Final Office Action Issued in U.S. Appl. No. 15/981,695", dated May 30, 2019, 19 Pages.
(Continued)

*Primary Examiner* — Michael A Keller
*Assistant Examiner* — Thao D Duong
(74) *Attorney, Agent, or Firm* — Holzer Patel Drennan

(57) ABSTRACT

Isolating resources between sub-entities. A method includes receiving data from a particular connected device. A memory storing a hierarchical graph that defines a topology for an entity is accessed. Branches or leaves in the graph include a node that represents a connected device, such as a sensor, controller, or computing system. Each connected device is configured to provide data or receive control signals. Each of the branches or leaves can be indicated as belonging to a particular sub-entity. A particular branch from the hierarchical graph having the particular connected device is identified using the graph. A sub-entity to which the particular branch belongs is identified. The method identifies that the particular sub-entity should be isolated from other sub entities. The data from the particular connected device is provided to a set of resources specifically allocated for the particular sub-entity.

20 Claims, 8 Drawing Sheets

(51) Int. Cl.
*H04L 12/24* (2006.01)
*G06F 16/901* (2019.01)

(58) Field of Classification Search
CPC ...... G06F 16/285; G06F 16/958; G06F 21/33; G06Q 10/06; G06Q 10/067
See application file for complete search history.

(56) References Cited

U.S. PATENT DOCUMENTS

| | | | |
|---|---|---|---|
| 7,777,632 B2 | 8/2010 | Elwell | |
| 8,635,465 B1 * | 1/2014 | Juels | G06F 21/602 713/193 |
| 8,743,198 B2 | 6/2014 | Padmanabh et al. | |
| 8,797,159 B2 | 8/2014 | Kirkpatrick et al. | |
| 9,551,594 B1 | 1/2017 | Stamatakis | |
| 9,766,079 B1 | 9/2017 | Poel et al. | |
| 9,852,388 B1 | 12/2017 | Swieter et al. | |
| 9,853,827 B1 | 12/2017 | Goodnow et al. | |
| 9,875,333 B1 | 1/2018 | Verma et al. | |
| 9,921,726 B1 | 3/2018 | Sculley et al. | |
| 9,955,318 B1 | 4/2018 | Scheper et al. | |
| 10,181,139 B2 | 1/2019 | Glass et al. | |
| 2004/0003341 A1 | 1/2004 | Alsafadi et al. | |
| 2004/0024724 A1 | 2/2004 | Rubin | |
| 2004/0054726 A1 | 3/2004 | Doss et al. | |
| 2004/0153334 A1 | 8/2004 | Dione | |
| 2004/0193635 A1 | 9/2004 | Hsu et al. | |
| 2004/0231002 A1 | 11/2004 | Jansen | |
| 2005/0154494 A1 | 7/2005 | Ahmed | |
| 2006/0015376 A1 | 1/2006 | Sattler et al. | |
| 2006/0202834 A1 | 9/2006 | Moriwaki | |
| 2006/0248506 A1 | 11/2006 | Luo et al. | |
| 2007/0100872 A1 | 5/2007 | Bodin et al. | |
| 2007/0162315 A1 | 7/2007 | Hodges | |
| 2007/0168347 A1 | 7/2007 | Childress et al. | |
| 2007/0198708 A1 | 8/2007 | Moriwaki et al. | |
| 2007/0282661 A1 | 12/2007 | Franco | |
| 2007/0288291 A1 | 12/2007 | Earle | |
| 2008/0183483 A1 | 7/2008 | Hart | |
| 2008/0277486 A1 | 11/2008 | Seem et al. | |
| 2009/0006143 A1 | 1/2009 | Orttung et al. | |
| 2009/0063549 A1 * | 3/2009 | Bhatia | G06Q 30/00 |
| 2009/0077044 A1 | 3/2009 | Krishnaswamy et al. | |
| 2010/0299517 A1 | 11/2010 | Jukic et al. | |
| 2010/0318558 A1 | 12/2010 | Boothroyd | |
| 2012/0066197 A1 | 3/2012 | Rana et al. | |
| 2013/0223279 A1 | 8/2013 | Tinnakornsrisuphap et al. | |
| 2013/0262060 A1 * | 10/2013 | Higashi | G06F 17/5009 703/6 |
| 2014/0136377 A1 | 5/2014 | Taylor | |
| 2014/0297206 A1 | 10/2014 | Silverman | |
| 2014/0309914 A1 | 10/2014 | Scofield et al. | |
| 2014/0351181 A1 | 11/2014 | Canoy et al. | |
| 2014/0366105 A1 | 12/2014 | Bradley et al. | |
| 2015/0032777 A1 | 1/2015 | Dietrich et al. | |
| 2015/0193739 A1 | 7/2015 | Min et al. | |
| 2015/0278335 A1 | 10/2015 | Opitz et al. | |
| 2016/0071219 A1 | 3/2016 | Joshi et al. | |
| 2016/0072891 A1 | 3/2016 | Joshi et al. | |
| 2016/0135241 A1 | 5/2016 | Gujral et al. | |
| 2016/0147962 A1 | 5/2016 | Vollmar et al. | |
| 2016/0285717 A1 | 9/2016 | Kim et al. | |
| 2016/0291942 A1 | 10/2016 | Hutchison | |
| 2016/0314542 A1 | 10/2016 | Vollmar et al. | |
| 2016/0357524 A1 | 12/2016 | Maluf et al. | |
| 2017/0026806 A1 | 1/2017 | Jampani et al. | |
| 2017/0083386 A1 | 3/2017 | Wing et al. | |
| 2017/0168472 A1 | 6/2017 | Ando et al. | |
| 2017/0171313 A1 | 6/2017 | Britt et al. | |
| 2017/0242881 A1 * | 8/2017 | Northfleet | G06F 9/50 |
| 2017/0244742 A1 * | 8/2017 | Helmsen | H04L 63/1416 |
| 2017/0247264 A1 | 8/2017 | Eddy | |
| 2017/0285081 A1 | 10/2017 | Silverman | |
| 2018/0096589 A1 | 4/2018 | Lynch et al. | |
| 2018/0116004 A1 | 4/2018 | Britt et al. | |
| 2018/0137858 A1 * | 5/2018 | Saxena | G10L 15/22 |
| 2018/0208448 A1 | 7/2018 | Zimmerman et al. | |
| 2019/0130367 A1 | 5/2019 | Pell et al. | |
| 2019/0289648 A1 | 9/2019 | Kim et al. | |
| 2019/0354906 A1 | 11/2019 | Stanciu et al. | |
| 2019/0354910 A1 | 11/2019 | Escapa et al. | |
| 2019/0356538 A1 | 11/2019 | Stanciu et al. | |
| 2019/0356550 A1 | 11/2019 | Stanciu et al. | |
| 2020/0042639 A1 | 2/2020 | Mathison et al. | |
| 2020/0162847 A1 | 5/2020 | Viton et al. | |

OTHER PUBLICATIONS

"INT (x86 instruction)", Retrieved From: https://en.wikipedia.org/w/index.php?title=INT_(x86_instruction)&oldid=809423342, Nov. 9, 2017, 2 Pages.

"International Search Report and Written Opinion Issued in PCT Patent Application No. PCT/US19/030779", dated Jul. 10, 2019, 12 Pages.

"International Search Report and Written Opinion Issued in PCT Application No. PCT/US19/030796", dated Jul. 26, 2019, 10 Pages.

"International Search Report and Written Opinion Issued in PCT Application No. PCT/US19/030798", dated Jul. 26, 2019, 12 Pages.

"International Search Report and Written Opinion Issued in PCT Application No. PCT/US19/030797", dated Jul. 8, 2019, 13 Pages.

"Final Office Action Issued in U.S. Appl. No. 15/981,695", dated Nov. 8, 2019, 16 Pages.

"Notice of Allowance Issued in U.S. Appl. No. 15/981,695", dated Jan. 28, 2020, 9 Pages.

"Non Final Office Action Issued in U.S. Appl. No. 15/985,487", dated Mar. 25, 2020, 39 Pages.

"Non Final Office Action Issued in U.S. Appl. No. 15/985,513", dated Mar. 18, 2020, 28 Pages.

"Non Final Office Action Issued in U.S. Appl. No. 15/985,228", dated May 12, 2020, 20 Pages.

"Final Office Action Issued in U.S. Appl. No. 15/985,513", dated Jun. 5, 2020, 25 Pages.

* cited by examiner

NESTED TENANTS

BACKGROUND

Background and Relevant Art

Computers and computing systems have affected nearly every aspect of modern living. Computers are generally involved in work, recreation, healthcare, transportation, entertainment, household management, etc. A computing system can be manifested through a variety of form factors such as computers, laptops, smartphones, gateways, controllers, IoT devices and sensors Further, computing system functionality can be enhanced by a computing systems' ability to be interconnected to other computing systems via network connections. Network connections may include, but are not limited to, connections via wired or wireless Ethernet, wireless mesh networks, cellular connections, or even computer to computer connections through serial, parallel, USB, or other connections via a wide variety of protocols (such as, but not limited to, MQTT, AMQP, http, Bluetooth, OPC-UA, SCADA, CoAP, BACnet, Modbus, KNX, LonTalk, Zigbee, Zwave, Sigfox, LoRa, etc.), some of which are industry or domain specific. The connections allow a computing system to access services at other computing systems and to quickly and efficiently receive data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud-based service providers have become prevalent. A cloud-based service provider hosts various services that can be used by cloud tenants. For example, at a most basic level, cloud-based service providers can provide compute resources (such as hardware-based processor cycles); storage resources (such as memory, mass storage, and the like); and network resources. Additionally, or alternatively, cloud-based service providers provide more complex services. For example, cloud-based service providers can provide various functional components configured to perform various tasks for a cloud tenant. Alternatively, or additionally, cloud-based service providers provide data analytics functionality on data for a cloud tenant. Alternatively, or additionally, cloud-based service providers can provide event generation and event servicing functionality for cloud tenants.

Often, a cloud-based service provider will service a number of different tenants simultaneously. However, each of those tenants may expect that certain data security requirements are met. For example, tenants of a cloud-based service may expect that their data should not be accessible by other tenants of the cloud-based service. This can be complicated due to the very nature of cloud-based services where the very nature of such services is to pool hardware resources such as processors, memory, mass storage, networking hardware, data analysis engines, eventing systems, functional systems, and the like for a number of different tenants allowing for efficient use of such resources. In particular, an underlying characteristic of cloud-based service providers is that they are able to make efficient use of various resources by sharing those resources and attempting to maximize their usage by using any underutilized or idle resources for tenants needing those resources. This can become even more complicated when a tenant has their own sub-customers (e.g., sub-tenants) for which they need to maintain isolation of data.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of (or system for) isolating resources between sub-entities. The method includes receiving data from a particular connected device. A memory storing a hierarchical graph that defines a topology for an entity is accessed. The hierarchical graph includes a top node for the entity and a plurality of branches or leaves coupled, through 0 or more intermediate nodes, to the top node of the entity. One or more of the branches or leaves in the plurality of branches or leaves includes a node that represents a connected device, such as a sensor, controller, or computing system. Each connected device is configured to provide data or receive control signals. Each of the branches or leaves can be indicated as belonging to a particular sub-entity. A particular branch or leaf from the hierarchical graph having the particular connected device is identified using the graph. A sub-entity to which the particular branch or leaf belongs is identified. The method identifies that the particular sub-entity should be isolated from other sub entities. The data from the particular connected device is provided to a set of resources specifically allocated for the particular sub-entity and configured so as to not provide the data to other sub-entities to which other branches or leaves belong which are correlated to different sets of resources.

In some embodiments, the top node represents a cloud tenant on the service, and one or more of the branches or leaves represent customers of the cloud tenant. In some embodiments, one or more branches or leaves represent divisions of an organization. In some embodiments, one or more branches or leaves represent locations of an organization. In some embodiments, different sets of resources for different branches or leaves are configured to comply with resource centric requirements. For example, connected devices represented in branches or leaves for certain locations may be provided only to hardware that complies with local laws for that location. In some embodiments, one or more branches or leaves represent floors of a building. In some embodiments, one or more branches or leaves represent areas of floors of a building.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments herein are directed to using a hierarchical graph of an entity such as a tenant of a cloud-based service provider, where the hierarchical graph also includes representations of sub entities, such as customers of tenants of a cloud-based service provider. An indication can be stored that certain branches or leaves of the hierarchical graph belong to sub entities which require isolation from other sub entities. A branch as used herein is a node and its children while a leaf is an external node.

Embodiments further include a service which is configured to identify various sub entities based on the hierarchical graph. The service a highly scalable service receiving data from devices. In particular, the service may be an always available/connected service endpoint in the "cloud" to which a device can communicate. The service is coupled to various sets of resources. The various sets of resources can be operated in isolation to one another. As such, the service can receive data from various connected devices (such as various sensors, computing systems, and the like). The service can then identify, using the hierarchical graph, a first sub entity to which the data belongs. The service can then direct the data to a particular set of resources allocated for that first sub entity. The resources allocated for that first sub entity are isolated from resources used by other sub entities. Thus, the other sub entities would not be able to access the data for the first sub entity as they would not have access to the set of resources allocated for the first sub entity.

Figure 6:
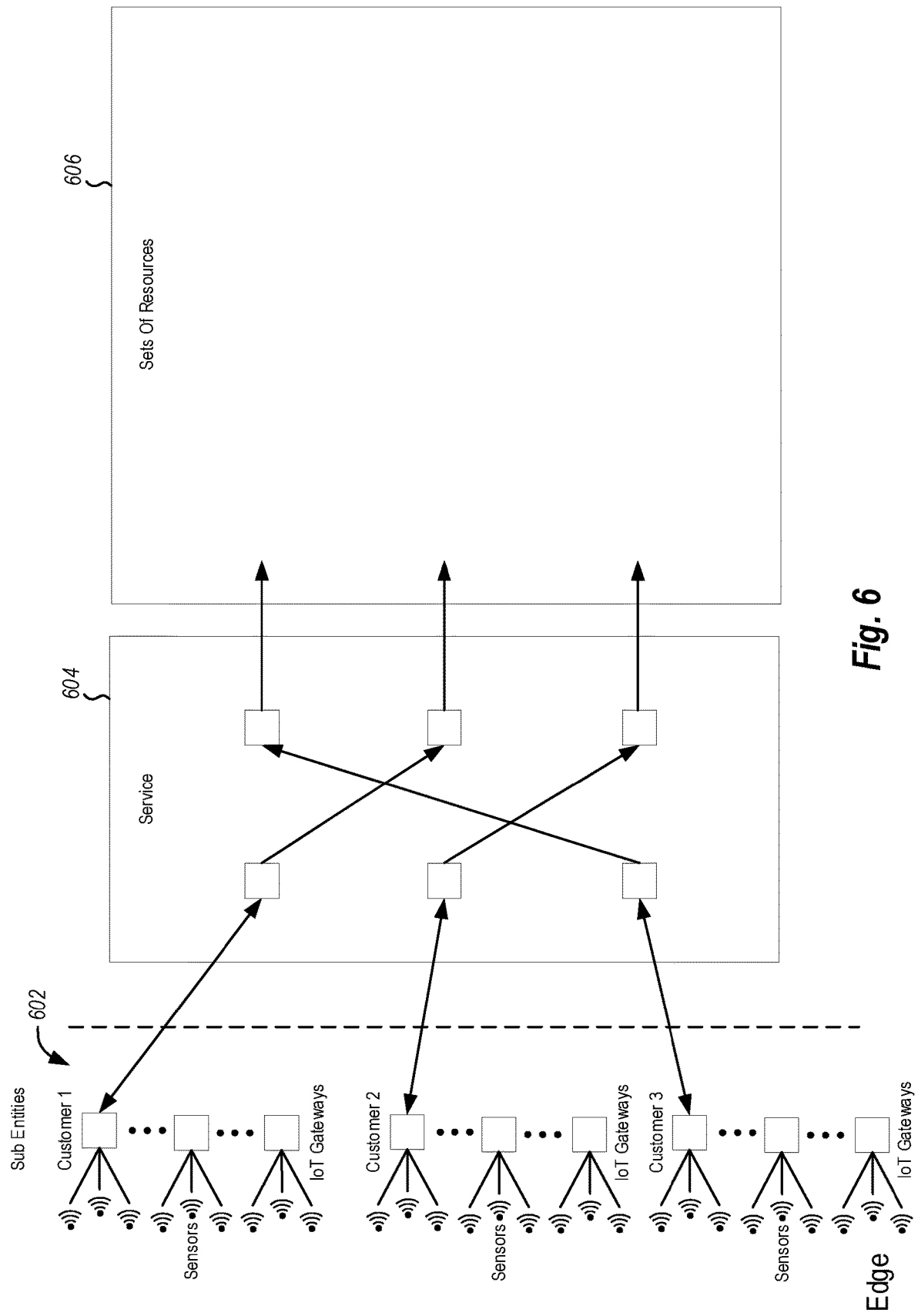
FIG. 6 illustrates an architecture representation for a system for isolating resources for various sub-entities.

These embodiments will be discussed in more detail below in conjunction with the description of FIG. 6. However, for introductory purposes, a high-level introduction of the concepts illustrated in FIG. 6 are now presented. FIG. 6 illustrates a plurality of sub entities 602. The sub entities 602 are coupled to a service 604. As noted above, the service 604 is configured to use a hierarchical graph, which will be discussed in considerable detail below, to identify sub entities. In particular, the service 604 can receive data from connected devices (such as sensors, controllers, computing systems, etc.) associated with the sub entities 602, and based on an identification of the connected device from which the data was received, the service 604 can identify a particular sub entity. If the service 604 determines that the sub entity requires isolation for data for the sub entity, then the service 604 can enforce that isolation by appropriate selection of cloud resources.

In particular, the service 604 is connected to a plurality of sets of resources 606. Each individual set of resources can be operated in isolation from other sets of resources. Therefore, if the service 604 uses a particular set of resources for a first sub entity, and does not use that particular set of resources for other sub entities. Thus, the other sub entities will not be able to access data for the first sub entity. It should be noted, that in some embodiments when isolation is not necessary, different entities can share sets of resources. However, when a sub entity requires isolation, then that isolation can be provided by assigning that sub entity to a particular set of resources that is exclusive to that sub entity by excluding other sub entities from using the particular set of resources. As noted previously, this can all be accomplished by using a hierarchical graph where branches or leaves of the hierarchical graph can be identified as belonging to sub entities requiring isolation from other sub entities. Background information for such a hierarchical graph is now illustrated with reference to FIGS. 1 through 4.

Some introductory discussion of a computing system will be described with respect to FIG. 1. Then providing access to sensor data from devices within a physical space, consistent with the multi-database environment introduced above, will be described with respect to FIGS. 2 through 4.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
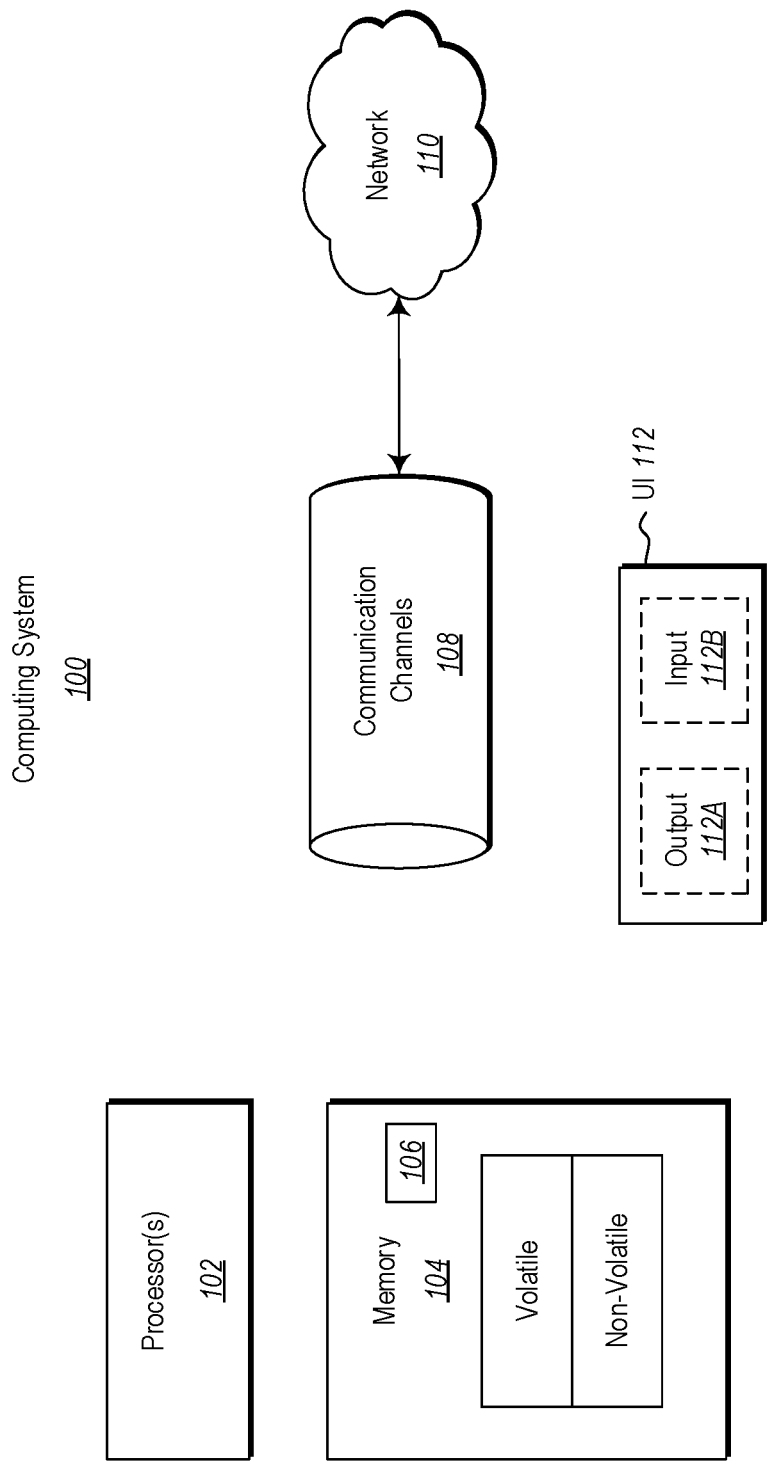
FIG. 1 illustrates an example computer architecture that facilitates operation of the principles described herein.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes NAND flash memory or other flash memory, RAM, DRAM, SRAM, ROM, EEPROM, CD-ROM or other optical disk storage, solid-state disk storage, magnetic disk storage or other storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, traditional computing systems such as smartphones, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses, watches, etc.) and the like. In modern computing systems, in the age of Internet of Things (IoT), computing system configurations may be virtually any type of device including (but most certainly not limited to) smart luggage, smart clothing, smart jewelry, smart drinking bottles, smart skate boards, smart golf clubs, smart toys, smart brewing machines, smart wallets, smart home and business automation gear, smart appliances, smart furniture, etc. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Reference is made frequently herein to IoT devices. As used herein, an IoT device can include any device that is connected to a network (whether that be a personal area network, local area network, wide area network, and/or the Internet) and that interacts with a physical environment (whether that be to control or influence some aspect of a physical environment, and/or to receive sensor data from a physical environment). As such, references to IoT devices herein should be interpreted broadly to include vast categories of devices, regardless of how those devices may be named or marketed. From a computing perspective, IoT devices may range from fairly complex (e.g., such as being embodied on a general-purpose computer system), to fairly simple (e.g., such as being embodied within a special-purpose microcontroller environment).

Figure 2:
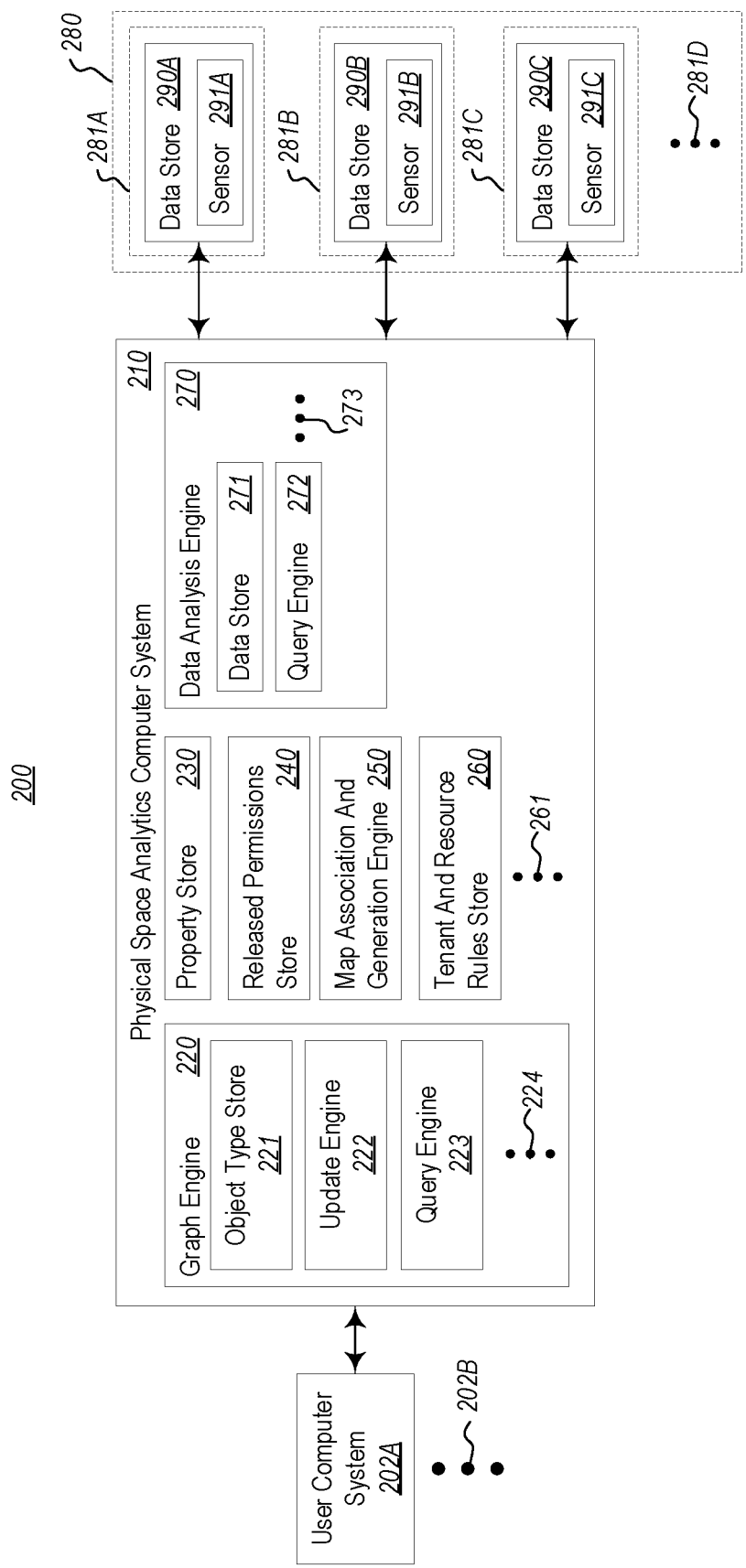
FIG. 2 illustrates an example environment for providing access to sensor data from devices within a physical space.

FIG. 2 illustrates an example environment 200 for providing access to sensor data from devices within a physical space. As illustrated, the environment 200 includes a user computer system 202A. The user computer system 202A may be embodied, for example, by computer system 100, as described with respect to FIG. 1. The user computer system 202A may comprise any type of computer system that is configured to communicate with, and utilize the functionality of, a server computer system 210, which is described later. In an example, the user computer system 202A may comprise a desktop computer, a laptop computer, a tablet, a smartphone, and so forth. Notably, while the environment 200 includes a single user computer system 202A, the ellipses 202B represents that any number of user computer systems may communicate with, and utilize the functionality of, the server computer system 210.

The server computer system 210 is configured to provide access to sensor data from devices (such as IoT devices) located within physical spaces (e.g., a room within a building), as further described herein. Again, the server computer system 210 may be embodied, for example, by computer system 100, as described with respect to FIG. 1. The server computer system 210 may comprise any type of computer system, including any combination of hardware and/or software that is configured to provide access to sensor data from devices located within particular physical spaces.

As shown, the server computer system 210 may include various engines, functional blocks, and components, including (as examples) a graph engine 220, a property store 230, a rules and permissions store 240, an association and generation engine 250, a tenant and resource rules store 260, and a data analysis engine 270, each of which may also include additional engines, functional blocks, and components (e.g., an object type store 221 within the graph engine 220). The various engines, components, and/or functional blocks of the server computer system 210 may be implemented on a single computer system, or may be implemented as a distributed computer system that includes elements resident in a cloud environment, and/or that implement aspects of cloud computing (i.e., at least one of the various illustrated engines may be implemented locally, while at least one other engine may be implemented remotely). In addition, the various engines, functional blocks, and/or components of the server computer system 210 may be implemented as software, hardware, or a combination of software and hardware.

Notably, the configuration of the server computer system 210 illustrated in FIG. 2 is shown only for exemplary purposes. As such, the server computer system 210 may include more or less than the engines, functional blocks, and/or components illustrated in FIG. 2. In particular, the ellipses 261 represent that any number of engines, functional blocks, and/or components may be utilized within the server computer system. Although not illustrated, the various engines of the server computer system 210 may access and/or utilize a processor and memory, such as the processor 102 and the memory 104 of FIG. 1, as needed, to perform their various functions.

Figure 3:
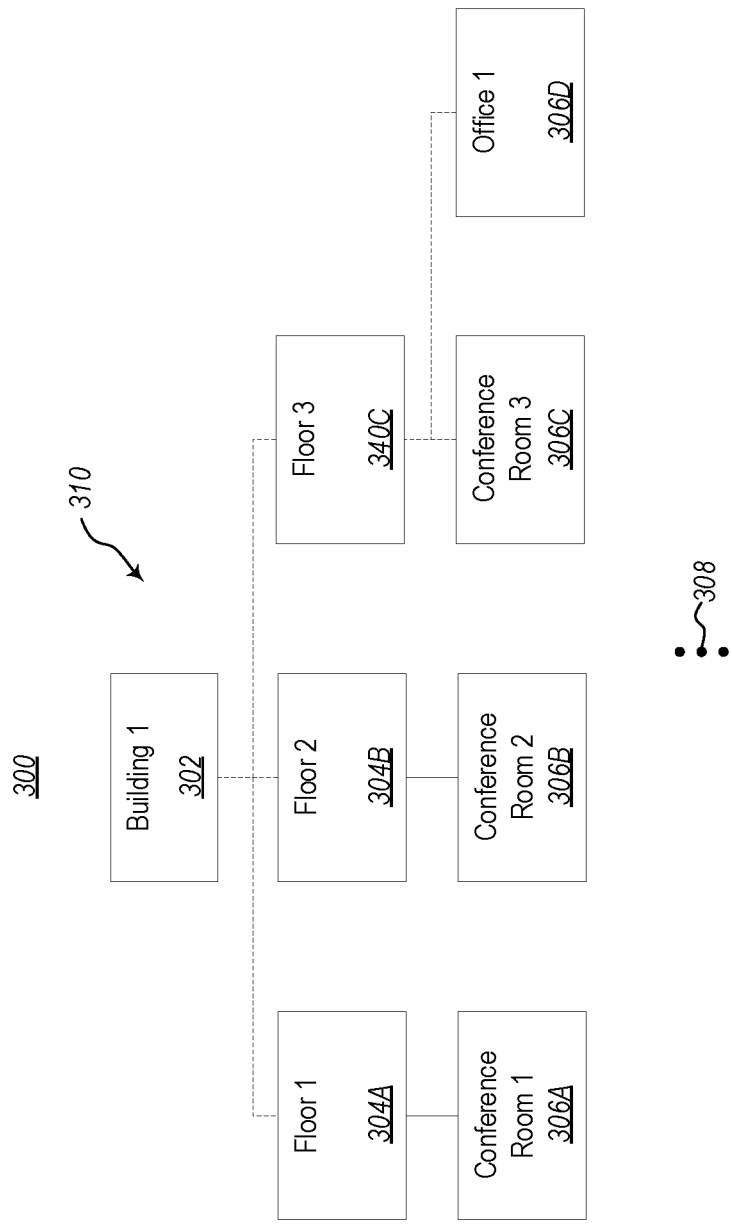
FIG. 3 illustrates an example hierarchical graph associated with a physical space.

As briefly introduced, the server computer system 210 includes the graph engine 220, the property store 230, the rules and permissions store 240, the association and generation engine 250, the tenant and resource rules store 260, and the data analysis engine 270. The graph engine 220 may be configured to generate, store, and/or manage one or more hierarchical graphs (e.g., hierarchical graph 310 of FIG. 3) that defines a topology of areas and sub-areas of a physical space. For instance, FIG. 3 illustrates a hierarchical graph 310 that includes a topology of nodes associated with a physical space comprising "building 1" (e.g., building node 302). The hierarchical graph 310 also represents areas and sub-areas of "building 1," such as different floors (i.e., floor node 304A, floor node 304B, and floor node 304C, all of which are sub-nodes of building node 302), as well as different rooms (i.e., conference room node 306A, conference room node 306B, conference room node 306C, and office node 306D) associated with each floor. Although not shown, each of the room nodes 306A-306A could be associated with additional sub-nodes representing objects in, or associated with, the rooms, such as desks, chairs, tables, computer, lab equipment, services to control the room, services to reserve the room, etc.

Figure 4:
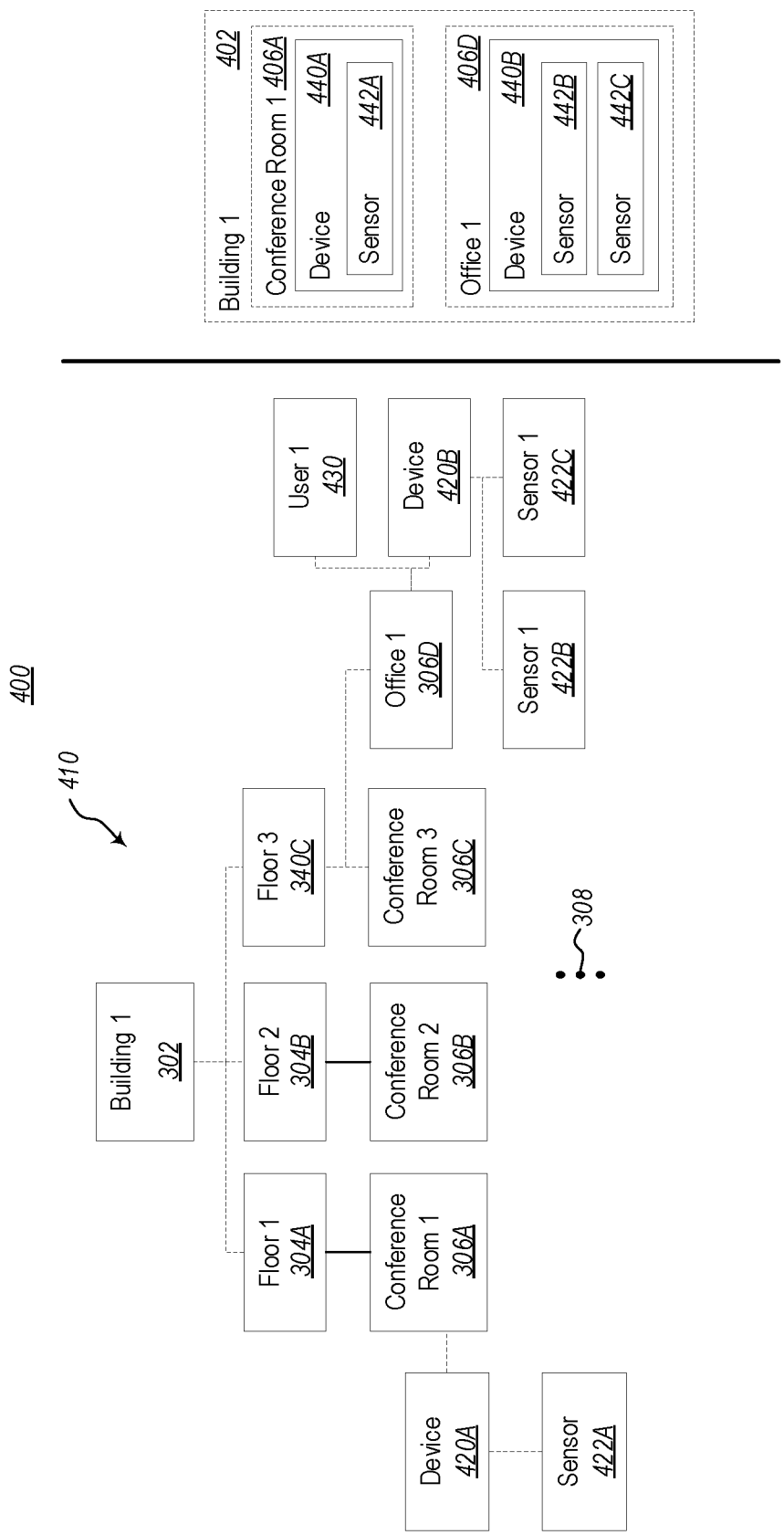
FIG. 4 illustrates an example hierarchical graph associated with a physical space and devices associated with areas or sub-areas of the physical space.

Any node in the hierarchical graph 310 could be associated with devices/sensors. For example, the various room nodes (i.e., the conference room node 306A and the office node 306D) may also be associated with devices and sensors. Similarly, FIG. 4 shows a related graph 410, that includes device nodes 420A and 420B and sensor nodes 422A-422C. While only seven nodes associated with areas/sub-areas are illustrated in FIG. 3, the ellipses 308 represents that any number of nodes that are associated with areas/sub-areas and devices/sensors may be utilized when practicing the principles described herein (whether those nodes be added or deleted in a horizontal direction (breadth) or a vertical direction (depth)). Furthermore, the topology of the graph may be continuously modified via adding or deleting nodes of the graph (in a horizontal direction or vertical direction). For instance, using the example of FIG. 3, a number of additional building nodes associated with different buildings than building 1 (corresponding to building node 302), each of which additional buildings may include additional nodes corresponding to floors, rooms, and so forth, may also be included within the graph 310.

In some embodiments, the hierarchical graph 310 may be stored within a relational database, though any type of database could be used. Additionally, regardless of the type of graph used, the full paths in the graph for each given node may be stored as metadata in the node to increase the performance and efficiency of querying the hierarchical graph 310. In this way, identification (e.g., via a query) of any ancestral node or child node (i.e., children nodes, grandchildren nodes, great-grandchildren nodes, and so on) of a given node may be performed in an order of one operation (i.e., an O(1) operation). For instance, a query that requests each node having a path that starts with "building1/floor3" (i.e., corresponding to the floor node 304C) may identify conference room 3 and office 1 (i.e., corresponding to conference room node 306C and office node 306D, respectively) as being children of the floor node 304C in an O(1) operation.

Notably, even if the conference room node 306C and the office node 306D were grandchildren, great-grandchildren, and so on, of the floor node 304C, a request for identification of each node having a path that starts with "building1/floor3" could result in identification of the conference room node 306C and the office node 306D (as well as any nodes between the floor node 304C and the conference room node 306C/the office node 306D) in an O(1) operation. Accordingly, paths associated with each node may be automatically computed and saved, which effectively tracks a primary identification for each node of the graph. While a cost is incurred upfront to generate and store each path (e.g., in connection with the addition and/or removal of one or more nodes to within the graph), the graph may be quickly and efficiently traversed to identify nodes and relationships between nodes within the graph than traditional traversing of graphs. By storing primarily static information in the graph, however, the need to generate/store these paths can be relatively infrequent.

Returning to FIG. 2, as illustrated, the graph engine 220 includes various components that may comprise any combination of appropriate hardware and/or software, including an object type store 221, an update engine 222, and a query engine 223. Notably, the ellipses 224 represents that any number of components may be included with the graph engine 220 (i.e., more or less than the components illustrated within the graph engine 220).

The object type store 221 comprises a data store of node object types that can be selected to create additional nodes within the graph 310. For instance, in addition to the node object types of buildings, floors, and rooms that are explicitly shown in FIG. 3, any number of object types associated with areas/sub-areas of physical spaces (as well as devices/sensors and individuals, as further described herein) may be used within the graph 310, including but not limited to organizations (e.g., businesses), geographic regions (e.g., continents, countries, states, cities, counties, and so forth), types of areas (e.g., buildings, farms, houses, apartments, conference rooms, offices, bathrooms, breakrooms, study areas, desks, chairs, and so forth), types of devices (e.g., thermostat, projector, paper towel dispenser, television, computer, and so forth), types of sensors (e.g., thermocouple, thermistor, humidity sensor, $CO_2$ sensor, Geiger counter), and so forth. Additionally, the object type store 221 may be extensible, such that additional object types may be created on demand.

The update engine 222 may be configured to update the hierarchical graph 310 with any changes made to the graph. For instance, the update engine 222 may update the graph with additional nodes, update the graph with less nodes (e.g., deleted nodes), update nodes with new or modified properties, update nodes with new or modified paths, and perform any other operations associated with modifying or updating the graph.

The query engine 223 may be configured to allow for performing queries to the hierarchical graph 310. In particular, the query engine 223 may be configured to receive queries, generate query plans, build responses to queries, and/or perform any other operations associated with receiving and responding to queries of the hierarchical graph 310.

As briefly introduced, the server computer system 210 further includes data analysis engine 270. The data analysis engine 270 may be configured to receive, gather, manage, and process data received from devices/sensors located within a physical space (associated with the hierarchical graph that defines the topology of the physical space). For instance, FIG. 2 illustrates various devices and sensors located within a physical space 280. In particular, the physical space 280 comprises various areas and sub-areas, including area/sub-area 281A, area/sub-area 281B, and area/sub-area 281C. Each of the sub-areas includes a single device having a single sensor (i.e., area/sub-area 281A includes device 290A having sensor 291A, area/sub-area 281B includes device 290B having sensor 291B, and area/sub-area 281C includes device 290C having sensor 291C). Notably, while each of the areas/sub-areas within the physical space 280 includes a single device having a single sensor, the ellipses 290 represents that there may be any number of areas/sub-areas within the physical space 280, each of the areas/sub-areas including any number of devices having any number of sensors (including zero devices/sensors).

Notably, the devices and sensors may include any type of devices/sensors, including but not limited to devices/sensors associated with detecting temperature, $CO_2$, light, pressure, toxic chemicals, humidity, and so forth. As such, the combination of the devices 290 (i.e., the device 290A through the device 290C) and the sensors 291 (i.e., the sensor 291A through the sensor 291C) may be configured to capture sensor data (e.g., changes in temperature) and send the captured data to the data analysis engine 270. Furthermore, "sensors" can be partially or entirely virtual. A sensor, as used herein, does not have to be a physical device, but rather a "sensor" output could be a value provided by another cloud service or API. For example, a "sensor" could output the current weather forecast for a building's location from NOAA.

The data analysis engine 270 may then be configured to receive, gather, manage, and process data received from such devices/sensors. In particular, as illustrated, the data analysis may include a data store 271 that is configured to organize, store, and allow access to received sensor data. The data store 271 may comprise any type of data store that is configured to manage dynamic, frequently changing data such as sensor data, and that provides quick and efficient performance. In an example, the data store 271 may comprise a key-value database. For instance, the data store 271 may comprise a distributed, in-memory key-value store. Data associated with a particular device (e.g., sensor data) may also be linked with device nodes of the hierarchical graph (e.g., the hierarchical graph 410), such that upon identification of a device node within the hierarchical graph, sensor data associated with the device corresponding to the device node may also be accessed, as further described herein.

As shown, the data analysis engine 270 further includes a query engine 272. The query engine 272 may be configured to allow for performing queries to the data store 271. In particular, the query engine 272 may be configured to receive queries, generate query plans, build responses to queries, and/or perform any other operations associated with receiving and responding to queries of the data store 271.

FIG. 4 illustrates an environment 400 including hierarchical graph 410 comprising area/sub-area nodes, as well as device/sensor nodes that are each associated with one or more area/sub-area nodes. As shown, the conference room node 306A is associated with device node 420A (having a corresponding sensor node 422A) and the office node 306D is associated with the device node 420B (having two corresponding sensor nodes, the sensor node 422B and the sensor node 422C). Additionally, FIG. 4 includes a representation of an actual physical space 402 (associated with building 1) that corresponds to the building node 302.

As illustrated, the physical space 402 also comprises conference room 406A (associated with conference room 1 and corresponding to the conference room node 306A) that includes the actual physical device 440A having the sensor 442A, as well as office 406D (associated with office 1 and corresponding to the office node 306D) that includes the actual physical device 440B having both the sensor 442B and the sensor 442C. In a specific example, the device 440A may correspond to a thermostat that includes a thermocouple (i.e., the sensor 442A) for measuring temperature. Such temperature measurements may then be sent to the data analysis engine for managing, storing, and processing the received sensor data.

Additionally, as illustrated in FIG. 4, user nodes (e.g., user node 430) may be included within the hierarchical graph 410 as being associated with one or more area/sub-area nodes. In particular, FIG. 4 shows the user node 430 being associated with the office node 306D. In a specific example, the user 1 (i.e., corresponding to the user node 330) may comprise an individual that has been assigned to office 1 (i.e., corresponding to the office node 306D).

Notably, regardless of object/node type (e.g., area/sub-area nodes, device nodes, sensor nodes, user nodes), data and/or metadata associated with the node may be stored in the hierarchical graph (e.g., the hierarchical graph 310 or the hierarchical graph 410), the data store 271 of the data analysis engine 270, or any other appropriate location associated with the server computer system 210.

As briefly introduced, the server computer system 210 further includes property store 230, rules and permissions store 240, association and generation engine 250, and tenant and resource store 260. The property store 230 may comprise a data store that includes properties associated with nodes of the hierarchical graph 310. For instance, particular properties may automatically be associated with particular object types (i.e., node types), as well as children of such object types. In a more particular example, a property associated with occupancy of a chair within a room may propagate to the room itself (i.e., showing that the room is occupied). Furthermore, as discussed with respect to the object type store 231, the property store may also be extensible, such that properties may be created and associated with any given node, and potentially associated with ancestral or children nodes of the given node.

The rules and permissions store 240 may include various rules and permissions associated with particular roles assigned to users. For instance, based on a particular role (e.g., an administrator) assigned to a user, the user may have access to perform various operations, including adding/deleting nodes, modifying nodes, accessing/modifying functionality of various devices (e.g., locking doors), and so forth.

The association and generation engine 250 may be configured to perform numerous functions with respect to associating maps with the hierarchical graph (and devices providing data to the data store), and/or generating the hierarchical graph, itself. For instance, the association and generation engine 250 may be able to generate the hierarchal graph 300 based on user input and/or based on a map. In another example, the association and generation engine 250 may be able to link nodes of the hierarchical graph to locations or devices included within a map. In yet another example, the association and generation engine 250 may further be able to generate a map based on information included within the hierarchical graph corresponding to nodes of the hierarchical graph.

The tenant and resource rules store 260 may include rules associated with how resources, permissions, properties, and so forth are to be handled for each given entity (e.g., tenant) that utilizes the hierarchical graph.

Notably, the ellipses 261 represent that the server computer system 210 may include any number of components (i.e., whether more or less) than the components illustrated within the server computer system in FIG. 2. For instance, while both the graph engine 220 and the data analysis engine 270 include corresponding query engines (i.e., the query engine 223 and the query engine 272, respectively), an overarching query engine may be included within the physical analytics computer system that allows for querying both the graph engine 220 and the data analysis engine 270. In this way, a user may be able to generate queries that can traverse the hierarchical graph (e.g., the hierarchical graph 410) to identify one or more devices associated with a particular area/sub-area of the hierarchical graph, as well as current (or previous) sensor data associated with the one or more devices via the data store 271 and the data analysis engine 270.

Figure 5:
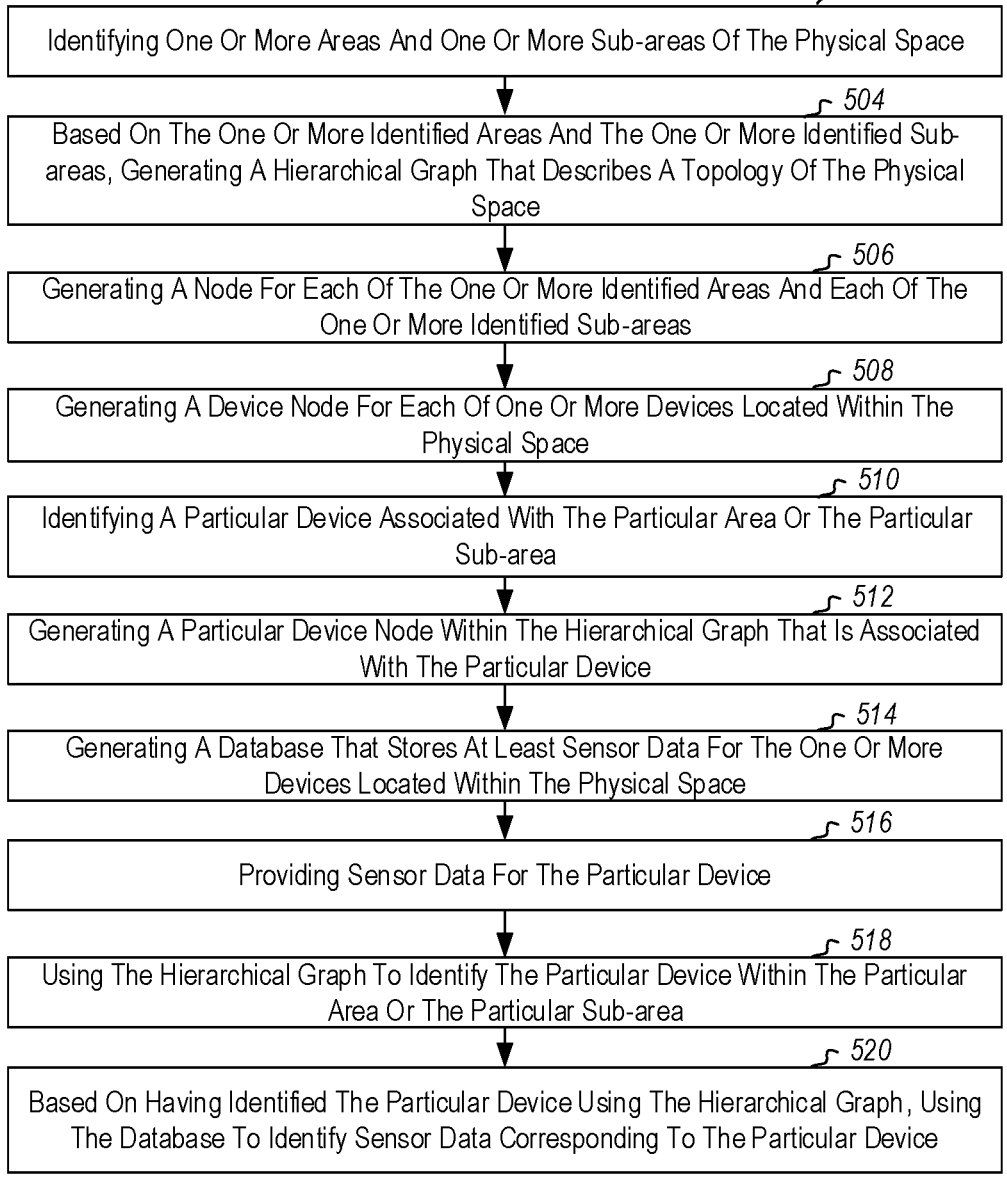
FIG. 5 illustrates a flowchart of a method for providing access to sensor data from devices within a physical space.

FIG. 5 illustrates a flowchart of a method 500 for providing access to sensor data from devices within a physical space. Note that different areas of a physical space may be allocated to different sub-entities. Thus, for example, a tenant may be both the tenant of a cloud service and a corresponding building but may have sub-lessees in the building corresponding to sub-entities (i.e., customers) of the tenant. The method 500 is described with frequent reference to the environments of FIGS. 2-4. As shown, the method 500 includes identifying one or more areas and one or more sub-areas of the physical space (Act 502). For instance, the building 402, the conference room 406A, and/or the office 406D of FIG. 4 may be identified by the association and generation engine 250. The method 500 further includes, based on the one or more identified areas and the one or more identified sub-areas, generating a hierarchical graph that describes a topology of the physical space (Act 504). For instance, based on the identification of the building 402 (and its corresponding areas/sub-areas), the hierarchical graph 410 may be generated by the association and generation engine 250.

Generating the hierarchical graph further includes generating a node for each of the one or more identified areas and each of the one or more identified sub-areas (Act 506). For example, the hierarchical graph 410 includes various nodes based on an identification of areas/sub-areas associated with the building 402. Generating the hierarchical graph also includes generating a device node for each of one or more devices located within the physical space (Act 508). For instance, an identification of the device 440A and the device 440B may result in generating the device node 420A and the device node 420B, respectively.

Generating the device node for each of one or more devices located within the physical space further includes, for a particular one of the one or more areas or the one or more sub-areas, identifying a particular device associated with the particular area or the particular sub-area (Act 510). The particular device may include one or more sensors that generate data. For example, the device 440A may be identified, as well as the sensor 442A.

Generating the device node for each of one or more devices located within the physical space further includes, for a particular one of the one or more areas or the one or more sub-areas, generating a particular device node within the hierarchical graph that is associated with the particular device (Act 512). The particular device node may be a sub-node of a particular node that was generated for the particular area or the particular sub-area. For instance, the device node 420A may be generated in response to identifying the device 440A and may further be associated with a particular area/sub-area node (i.e., the device node 420A being associated with the conference room node 306A). Additionally, any sensors associated with the device 440A may be identified, including the sensor 422A.

The method 500 further includes generating a database that stores at least sensor data for the one or more devices located within the physical space (Act 514). The database may be associated with, but separate from, the hierarchical graph. For example, the data store 271 may be generated for managing, storing, and accessing received sensor data. The method 500 may further include providing sensor data for the particular device (Act 516). For example, data from the sensor 442A of device 440A may be provided to the data store 271. In a more specific example, the sensor 442A may be configured to measure $CO_2$ levels, which measurements may be provided by the device 440A (or by another device capable of communicating with the device 440A) to the data store 271 (and ultimately, the data analysis engine 270).

Providing sensor data for the particular device may also include using the hierarchical graph to identify the particular device within the particular area or the particular sub-area (Act 518). For example, a query provided to the server computer system 210 (and perhaps directly to the graph engine 220) may request an identification of each device (and therefore each device node) associated with a particular area/sub-area (and therefore the particular area/sub-area node corresponding to the particular area/sub-area). Providing sensor data for the particular device may further include, based on having identified the particular device using the hierarchical graph, using the database to identify sensor data corresponding to the particular device (Act 520). For instance, upon identifying the device/device nodes (and the corresponding sensors/sensor nodes), sensor data associated with the devices/sensors may then be identified within the data store 271.

Accordingly, the principles described herein may allow for logically organizing devices (e.g., Internet of Things (IoT) devices) and/or users based on physical spaces (or areas/sub-areas of physical spaces), thus allowing for both intuitive organization, access, and control of a plurality of devices, as well as efficient use of such devices. For instance, each device associated with a particular area/sub-area (e.g., on a particular floor of a building or a particular room) may be easily shut off or placed in a reduced power state, as location-based groupings of devices are automatically created. In particular, relatively static physical space data (e.g., data regarding floors and rooms of a building) may be placed in a reliable graph (e.g., a relational database), while more dynamic sensor data may be managed in a more dynamic database (e.g., a key-value database such as a distributed, in-memory key-value store).

The reliability of hierarchical graph may be supplemented with quickness/efficiency by computing and storing paths associated with each node upfront when adding/removing/modifying nodes in the graph. Computing and storing the paths may then allow for performing queries with respect to ancestral nodes or child nodes of any given node in an O(1) operation. The hierarchical graph and the dynamic database may then be linked such that sensor data stored at the dynamic database may be quickly accessed when querying nodes associated with an area/sub-area within the hierarchical graph.

Figure 7:
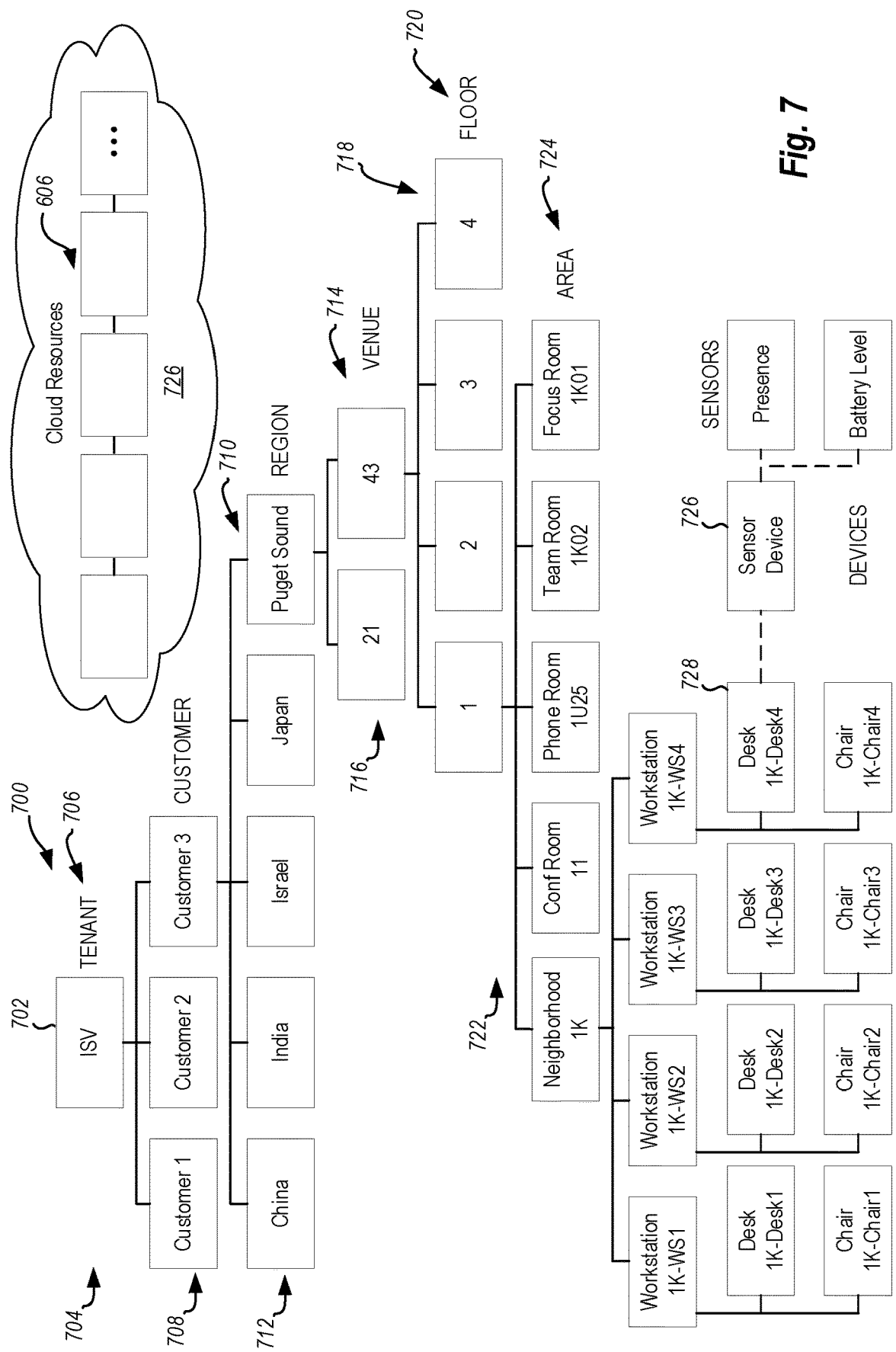
FIG. 7 illustrates an example hierarchical graph for a tenant of a cloud service.

Referring now to FIG. 7, a graph 700 is illustrated that may be used for some embodiments of the invention. The graph 700 includes several hierarchical levels. A top node 702 is illustrated in a tenant level 704. Note that the tenant level 704 is only an example and that in other embodiments other levels may be used. In particular the example illustrated in FIG. 7 is directed to the example where a tenant of a cloud service is implemented. Note that the tenants may subdivide services provided by the cloud service to provide those services to customers of the tenant. Thus, in the example illustrated in FIG. 7, customer nodes 706 are illustrated in a customer level 708. In the example illustrated, each individual customer may have various regions where facilities for the customer are implemented. For example, the regions may be geographical regions. In the illustrated example, therefore, region nodes 710 are illustrated in a region level 712 of the hierarchical graph 700 for customer 3 illustrated in the customer level 708.

FIG. 7 further illustrates that regions may be further subdivided into venues. In this example, the venues are building numbers in a region. Thus, the hierarchical graph 700 includes venue nodes 714 in a venue level 718. For example, venue nodes 714 may each represent a building in a region of a customer of a tenant.

FIG. 7 further illustrates that a particular venue can be further subdivided into floors. Thus, FIG. 7 illustrates a floor node 718 in a floor level 720.

FIG. 7 further illustrates that a given floor can be subdivided into areas. Thus, FIG. 7 illustrates area nodes 722 in an area level 724.

A given area may be further subdivided. The example illustrated in FIG. 7 illustrates that an area may be divided into workstations, which can be further divided into desks, further divided into chairs, and so forth.

Any of the nodes in the hierarchical graph 700 can be associated with devices. Thus, for example, given node may be associated with sensor, controller, computing system, etc. As noted above in the description of FIG. 1 through FIG. 4, sensor data can be stored in an easily accessible fashion.

An illustrative example is now illustrated. One embodiment may include a computing system, such as that illustrated in FIG. 1. The computing system may include a memory, where the memory stores a hierarchical graph that defines a topology for an entity. The memory may be, for example, RAM, mass storage, or other physical storage as discussed herein.

The hierarchical graph stored in the memory includes a top node for the entity. Note that while in the examples illustrated herein the tenant node 702 has been identified as the top node, it should be appreciated that other nodes in the illustrative examples could be the top node, even though other nodes are hierarchically higher than the "top node". For example, the node marked "Customer 3" could be a "top node" for purposes of embodiments illustrated herein.

The hierarchical graph further includes a plurality of branches or leaves coupled, through 0 or more intermediate nodes, to the top node of the entity. Each of the branches or leaves in the plurality of branches or leaves will have a node that represents a connected device. Each device is configured to, at least one of, provide data or receive control signals. Thus, for example, FIG. 7 illustrates a sensor device 726 coupled to a desk node 728 in a branch or leaf coupled to tenant node 702.

Each of the branches or leaves in a graph can be indicated as belonging to a particular sub-entity. Note that a given sub entity may be associated with only one given branch or leaf, or a sub entity could be associated with several different branches or leaves. Thus, for example, one branch or leaf may be defined as including the customer 3 node and all nodes coupled to the customer three node that are connected hierarchically below the customer 3 node. However, a different branch or leaf may be the Puget Sound node and all nodes connected hierarchically below the Puget Sound node. Thus, in the first example, the sub-entity is Customer 3 and the in second example, the sub-entity is Puget Sound. Note, a node is only hierarchically below another node if the graph can be traversed only upward from the node to the other node to reach the other node. Similarly, a node is only hierarchically above another node if the graph can be traversed only downward from the node to the other node.

Embodiments may further include a service, such as the service 604. In some embodiments, the service 604 may be included with the computing system including the memory storing the graph 700.

The service may be coupled (or may be at least configured to be coupled) to one or more sets of resources. For example, FIG. 6 illustrates a number of sets of resources 604. FIG. 7 illustrates that these resources may be implemented in a cloud system. Such cloud resources may include a number of different resources. For example, a set of cloud resources may include storage resources, such as memory or mass storage configured to store data. A set of cloud resources could include compute resources, such as processors, processor cores, and the like, configured to perform computations. Cloud resources could include network hardware configured to perform networking functions. Cloud resources could further be pre-configured in various ways to provide advanced resources and/or functionality. For example, cloud resources could be configured to collect data (such as data from connected devices, such as sensors, user computers (e.g., the workstations shown in FIG. 7), etc., and perform various analytic functions. In an alternative or additional example of advanced functionality, combinations of cloud resources could be used to provide events.

Each of the sets of resources can be accessed by the service 604 in isolation from each other set of resources. That is, the service can direct data to and from a set of resources without other sets of resources being able to access the data, and/or even know that any data is being directed to and from the set of resources.

The service 604 may be further configured to receive data from a particular device represented in the hierarchical graph. For example, the service 604 can receive data from the sensor device 726. A device, as used herein is any entity capable of sending and/or receiving data. Thus, devices could include sensors, controllers, computing systems, and the like.

The service 604 may be further configured to identify a particular branch or leaf from the hierarchical graph having the particular device. Thus, for example, in the example shown in FIG. 7, the sensor device 726 can be identified by the service 604 as belonging to the branch or leaf including the customer 3 node and nodes hierarchically below the customer 3 node. Alternatively, the branch or leaf may be the Puget Sound node and any nodes hierarchically below the Puget Sound node. Alternatively, the branch or leaf may be the 43 venue node and any nodes hierarchically below the 43 node. Alternatively, the branch or leaf may be the floor 1 node and any sounds hierarchically below the floor 1 node. And so forth.

The service 604 may be further configured to identify a sub-entity to which the particular branch or leaf belongs. This can be understood in the context of the branches or leaves off of the tenant node 702. In one example, the tenant associated with the tenant node 702 may be an entity that subscribes to cloud services from a cloud service provider. The tenant may wish to subdivide the services it is subscribed to with the cloud provider to customers of the tenant. Thus, branches or leaves off of the tenant node 702 may be created in the hierarchical graph 700 for each of the customers of the tenant. Each of these customers would be a sub-entity associated with a branch or leaf. The service 604 includes functionality to identify the sub-entities associated with a particular branch or leaf. Note that sub-entities could be, in the illustrated example, customers, regions, venues, floors, areas, workstations, desks, chairs, or virtually any other sub-entity. Thus, for example, as used herein a particular floor in a building may be a sub-entity that can be identified by the service 604.

The service 604 may further include functionality to identify that the particular sub-entity should be isolated from other sub entities. For example, the service may be able to access data indicating that that a particular branch or leaf should be isolated from other branches or leaves. For example, some embodiments may include a simple database of tenants, where each individual tenant represents a unit that requires isolation. Again, this can be understood in the customer context. Different customers of a tenant will not want their data available to other customers of the tenant. Therefore, there may be a need to isolate the data between customers. The service 604 can identify that this isolation needs to occur. For example, this may be accomplished by a data structure in the memory including an indication that a branch or leaf of the hierarchical graph 700 should be isolated.

The service 604 may further include functionality to provide the data from the particular device to a set of resources specifically allocated for the particular sub-entity and configured so as to not provide the data to other sub-entities to which other branches or leaves belong which are correlated to different sets of resources.

As illustrated above, embodiments may be implemented where the top node represents a cloud tenant on the service, and one or more of the branches or leaves represent customers of the cloud tenant.

As illustrated above, embodiments may be implemented where one or more branches or leaves represent divisions of an organization.

As illustrated above, embodiments may be implemented where one or more branches or leaves represent locations of an organization.

As illustrated above, embodiments may be implemented where different sets of resources for different branches or leaves are configured to comply with resource centric requirements. For example, a graph may have a branch or leaf for a location in a particular country. The service 604 may be configured to ensure that data from the branch or leaf for that location is only provided to a set of resources that complies with law for that particular country.

As illustrated above, embodiments may be implemented where one or more branches or leaves represent floors of a building.

As illustrated above, embodiments may be implemented where one or more branches or leaves represent areas of floors of a building.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 8:
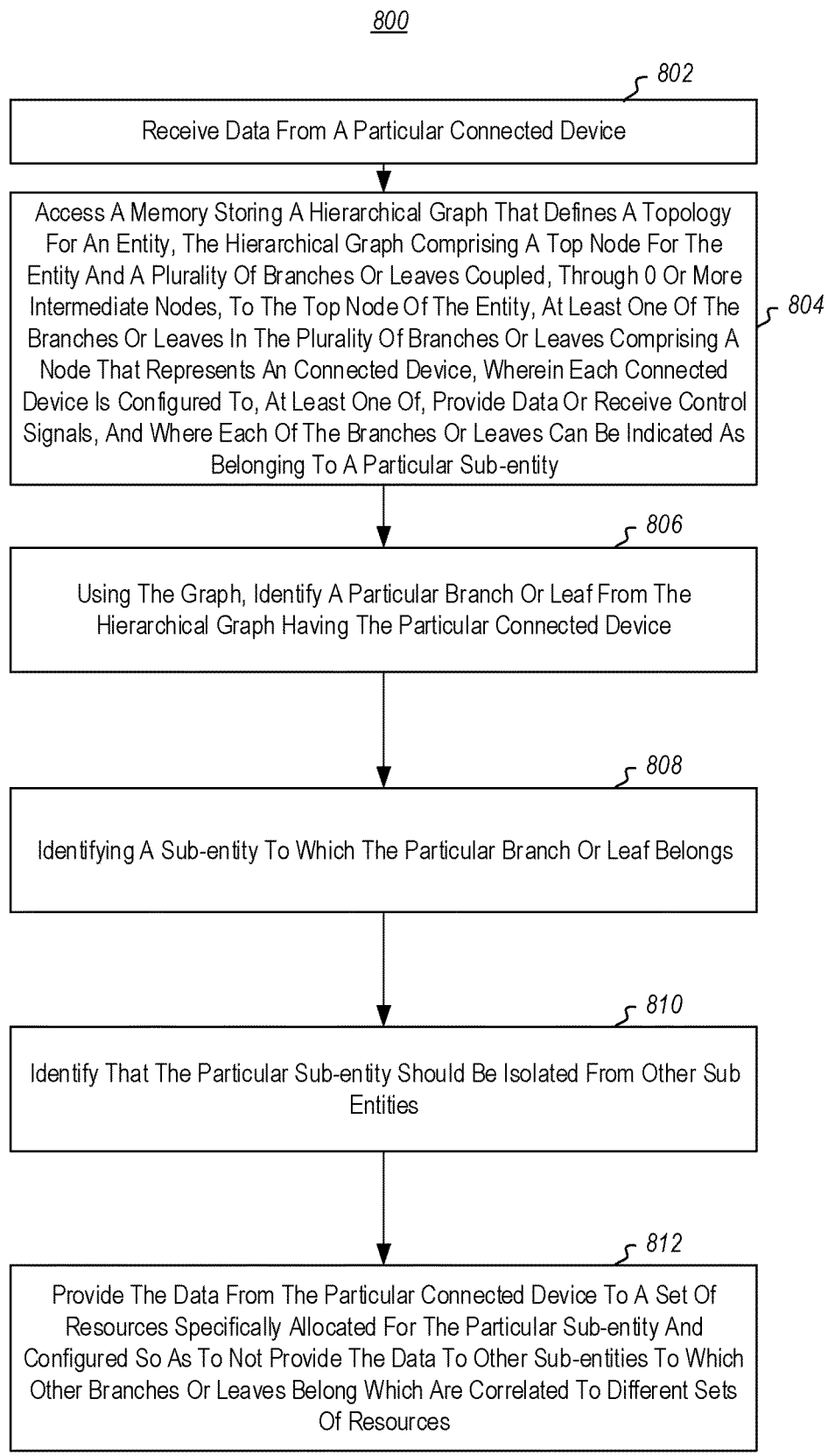
FIG. 8 illustrates a flowchart of a method for isolating resources between sub-entities.

Referring now to FIG. 8, a method 800 is illustrated.

The method 800 includes acts for isolating resources between sub-entities. The method 800 includes receiving data from a particular connected device (act 802). For example, data may be received from a sensor, controller, computing system, or the like.

The method 800 further includes accessing a memory storing a hierarchical graph that defines a topology for an entity, the hierarchical graph comprising a top node for the entity and a plurality of branches or leaves coupled, through 0 or more intermediate nodes, to the top node of the entity, each of the branches or leaves in the plurality of branches or leaves comprising a node that represents a connected device, wherein each connected device is configured to, at least one of, provide data or receive control signals, and where each of the branches or leaves can be indicated as belonging to a particular sub-entity (act 804).

The method 800 further includes using the graph, identifying a particular branch or leaf from the hierarchical graph having the particular connected device (act 806).

The method 800 further includes identifying a sub-entity to which the particular branch or leaf belongs (act 808).

The method 800 further includes identifying that the particular sub-entity should be isolated from other sub entities (act 810).

The method 800 further includes providing the data from the particular connected device to a set of resources specifically allocated for the particular sub-entity and configured so as to not provide the data to other sub-entities to which other branches or leaves belong which are correlated to different sets of resources (act 812).

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
a memory storing a hierarchical graph that defines a topology for an entity, the hierarchical graph comprising a top node for the entity and a plurality of branches or leaves coupled, through 0 or more intermediate nodes, to the top node of the entity, each of the branches or leaves in the plurality of branches or leaves comprising a node that identifies a connected device, wherein each connected device is configured to provide data or receive control signals, and where each of the branches or leaves is associated in memory with a different customer of the entity and each of the branches or leaves includes a collection of nodes identifying one or more connected devices of the associated customer;
a service, wherein the service is configured to:
be coupled to one or more sets of resources, wherein each of the sets of resources can be accessed by the service in isolation from each other set of resources;
receive data from a particular connected device identified by a first node in the hierarchical graph;
identify a particular branch or leaf from the hierarchical graph that includes the first node identifying the particular connected device;
use the hierarchical graph to identify a customer associated with the particular branch or leaf including the first node;
access a stored data structure to determine that data for the particular customer should be isolated from other customers of the entity associated with other branches or leaves of the hierarchical graph; and
provide the data from the particular connected device to a set of resources specifically allocated for the customer associated with the identified branch or leaf without providing the data to other customers of the entity associated with other branches or leaves correlated with different sets of resources.

2. The computing system of claim 1, wherein the top node represents a cloud tenant on the service.

3. The computing system of claim 1, wherein one or more branches or leaves represent divisions of an organization.

4. The computing system of claim 1, wherein one or more branches or leaves represent locations of an organization.

5. The computing system of claim 1, wherein different sets of resources for different branches or leaves are configured to comply with resource centric requirements specific to locations of the customer associated with each of the different branches or leaves.

6. The computing system of claim 1, wherein one or more branches or leaves represent floors of a building.

7. The computing system of claim 1, wherein one or more branches or leaves represent areas of floors of a building.

8. A method of isolating resources between sub-entities, the method comprising:
receiving data from a particular connected device;
accessing a memory storing a hierarchical graph that defines a topology for an entity, the hierarchical graph comprising a top node for the entity and a plurality of branches or leaves coupled, through 0 or more intermediate nodes, to the top node of the entity, each of the branches or leaves in the plurality of branches or leaves being associated in memory with a different customer of the entity and including a node that identifies a connected device, wherein each connected device is configured to provide data or receive control signals;
using the graph, identifying a particular branch or leaf from the hierarchical graph having the particular connected device and a customer associated with the particular branch or leaf;
access a stored data structure to determine that data of the particular customer should be isolated from other customers of the entity associated with other branches or leaves of the hierarchical graph; and
providing the data from the particular connected device to a set of resources specifically allocated for the particular customer associated with the particular branch or leaf without providing the data to other customers of the entity associated with other branches or leaves correlated with different sets of resources.

9. The method of claim 8, wherein the top node represents a cloud tenant on the service, and one or more of the branches or leaves represent customers of the cloud tenant.

10. The method of claim 8, wherein one or more branches or leaves represent divisions of an organization.

11. The method of claim 8, wherein one or more branches or leaves represent locations of an organization.

12. The method of claim 8, wherein different sets of resources for different branches or leaves are configured to comply with resource centric requirements specific to locations of the customer associated with each of the different branches or leaves.

13. The method of claim 8, wherein one or more branches or leaves represent floors of a building.

14. The method of claim 8, wherein one or more branches or leaves represent areas of floors of a building.

15. A computing system comprising:
one or more processors; and
one or more computer-readable media having stored thereon instructions that are executable by the one or more processors to configure the computer system to isolate resources between customers of an entity, including instructions that are executable to configure the computer system to perform at least the following:
receive data from a particular connected device;
access a memory storing a hierarchical graph that defines a topology for the entity, the hierarchical graph comprising a top node for the entity and a plurality of branches or leaves coupled, through 0 or more intermediate nodes, to the top node of the entity, each of the branches or leaves in the plurality of branches or leaves being associated in memory with a different one of the customers of the entity and including a collection of nodes identifying one or more connected devices of the associated customer, wherein each connected device is configured to provide data or receive control signals;
using the graph, identify a particular branch from the hierarchical graph having the particular connected device and a particular customer associated with the particular branch;
access a stored data structure to determine that data for the particular customer should be isolated from other customers associated with other branches of the hierarchical graph; and
provide the data from the particular connected device to a set of resources specifically allocated for the particular customer without providing the data to other customers of the entity associated with other branches or leaves correlated with different sets of resources.

16. The computing system of claim 15, wherein the top node represents a cloud tenant on the service, and one or more of the branches or leaves represent customers of the cloud tenant.

17. The computing system of claim 15, wherein one or more branches or leaves represent divisions of an organization.

18. The computing system of claim 15, wherein one or more branches or leaves represent locations of an organization.

19. The computing system of claim 18, wherein different sets of resources for different branches or leaves are configured to comply with resource centric requirements.

20. The computing system of claim 15, wherein one or more branches or leaves represent floors of a building.

* * * * *